United States Patent [19]

Labadia del Fresno

[11] Patent Number: 5,088,389
[45] Date of Patent: Feb. 18, 1992

[54] HOUSEHOLD TOASTERS

[76] Inventor: Miguel Labadia del Fresno, Miracruz, 5, 20001 San Sebastían Guipuzcoa, Spain

[21] Appl. No.: 647,552

[22] Filed: Jan. 29, 1991

[30] Foreign Application Priority Data

Jan. 31, 1990 [ES] Spain ................... 900.0290

[51] Int. Cl.⁵ .................. A47J 37/08; H05B 1/02
[52] U.S. Cl. .................... 99/327; 99/329 R; 99/332; 99/342; 99/385; 219/464; 219/492; 219/501
[58] Field of Search ........ 99/327, 328, 329 P, 99/329 R, 329 RT, 332, 335, 331, 385, 389, 391; 219/449, 460, 461, 464, 465, 491, 492, 493, 501

[56] References Cited

U.S. PATENT DOCUMENTS

| | | | |
|---|---|---|---|
| 4,296,312 | 10/1981 | Salem | 219/501 |
| 4,395,621 | 7/1983 | Parker | 99/329 R |
| 4,454,803 | 6/1984 | Wolf et al. | 99/329 RT |
| 4,487,115 | 12/1984 | Su | 99/327 |
| 4,503,758 | 3/1985 | Carville | 99/391 |
| 4,510,376 | 4/1985 | Schneider | 219/492 |
| 4,577,550 | 3/1986 | Maroti et al. | 99/329 RT |
| 4,755,656 | 7/1988 | Charlesworth et al. | 219/492 |
| 4,976,194 | 12/1990 | Kelterborn et al. | 99/329 R |

FOREIGN PATENT DOCUMENTS 2736596 2/1979 Fed. Rep. of Germany ........ 99/327

*Primary Examiner*—Timothy F. Simone
*Attorney, Agent, or Firm*—Helfgott & Karas

[57] ABSTRACT

A household toaster is operated at will asymmetrically, e.g. at one side, or at low power, or so as to keep a toast warm after a given toasting cycle. The toaster has a power control circuit which includes a power stage which controls heating resistors of the toaster. The power stage comprises two triacs, tripped at zero passage due to a provision of a zero passage detector. The higher or lower power supplied to the resistors in the various operating modes is always carried out by means of full cycles of the system, either continuously in the case of top output, or by means of cycle trains, controlled by a power control, a selector circuit and a heat holding timer. The toaster is provided with a start button and an ejector-and-stop button as well as a toaster control timer, indicators and actuators.

4 Claims, 1 Drawing Sheet

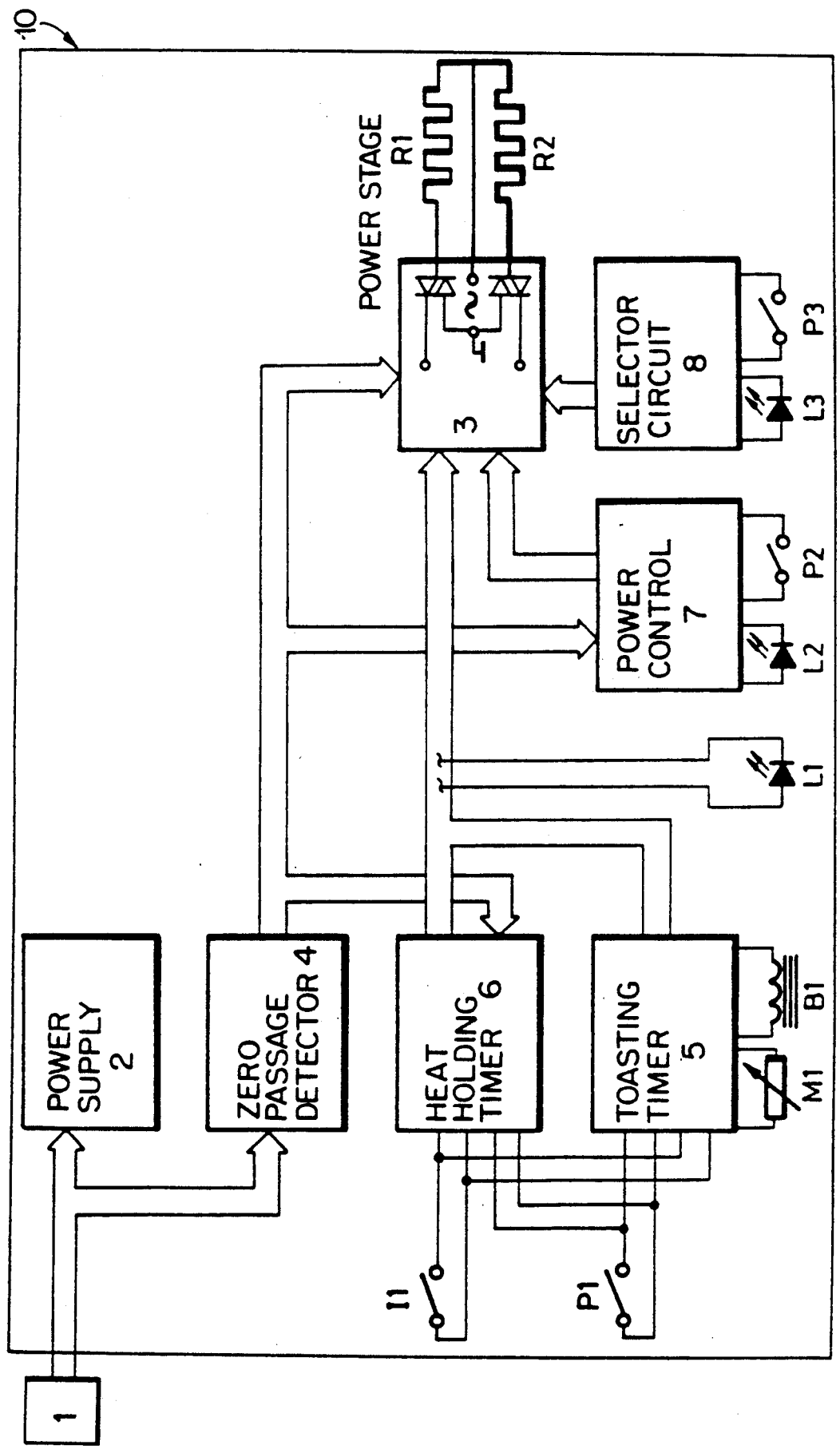

HOUSEHOLD TOASTERS

The present invention relates to improvements in household toasters, specifically those designed to toast slices of bread, rolls sliced lengthwise or like products, using resistors between which the piece of bread to be toasted is placed as a heat source.

BACKGROUND TO THE INVENTION

Toasters are known which have a carcass provided with two resistors that can be: housed in quartz tubes, coiled in ceramic forms or wound on a mica compound, which resistors are placed next to the inner side of the larger side walls of the carcass and defining a middle receptacle where the pieces of bread to be toasted are placed, delimited by a pair of grids that prevent the bread from touching the resistors, the bottom of such receptacle moreover being provided with an ejector that can be pushed down toward the bottom of the receptacle by means of an external level, held there and automatically released by means of a thermostat or control timer, likewise causing the bread slices to be automatically thrown out of the receptacle.

These toasters are, broadly speaking, wholly acceptable when toasting ready sliced packed bread or like products requiring the same amount of heat on both face-sides. However, they have the following disadvantages or inconveniences.

It is increasingly frequent for the conventional "toasts" to be made using bread loaves or rolls, instead of ready sliced packed bread, in other words, bread with crust on one side and obtained by slicing the bread loaf or roll in half. This means that when the half-loaf is inserted in the toaster, one of its sides exposes the crumb to one of the heat sources in such toaster while the other exposes the already baked crust which will nevertheless receive the same amount of heat, which also means that in order to toast the crumb side to the necessary extent, the crust will be over-hardened and sometimes even burnt.

This limits the use of the toasters and requires the use of grills to make toasts of this sort, which is slower and more complicated than using toasters of the aforesaid type.

Because of the power generated by toasters sold on the market and suitable for a sufficiently short space of time to be acceptable to most consumers, toasting usually results in toasts with a very thin crunchy layer and a soft and raw inside. This is not what people who like "crunchy toasts" want, in other words, toasts uniformly toasted throughout. To make this sort of toasts, the toaster output should be far less than the usual and toasting time would obviously increase.

Since time or toast control toasters are automatic appliances that are not watched over once toasting begins, it could happen that when the toast is taken out enough time has elapsed for the latter to have cooled down, after the heating resistors are automatically switched off, and it is no longer as tempting as when warm.

An attempt to solve this latter problem in a market toaster involves a system which holds the toaster ejector mechanically when the heating cycle is completed. Thus, the toast remains inside the toaster, though the heating resistors are now off, until the ejector button is pushed. This system whereby heat remaining within the toaster is used is effective to some extent but for only a very short space of time.

SUMMARY OF THE INVENTION

The improvements in household toasters, subject of the invention, are designed and structured for a toaster to be used, besides as a conventional toaster, as an "asymmetrical" toaster with only the one heat source located on one of the receptacle's side walls, so as to allow ordinary bread loaves and rolls sliced in half to be toasted, heating only one of the sides, in other words, the side opposite the crust; to be used, at will, at reduced output, half the usual amount, to make "crunchy toasts", i.e., with the inner crumb toasted, and keep the toast warm after the toasting cycle is over for roughly at least ten minutes, or whatever shall be selected when adjusting the appliance during manufacture, with the resistors working at one-eighth or other fraction of the usual output. This takes place with the toast already "ejected", in other words, partially projecting from the top of the toaster.

In order to achieve the above performance, four different power systems are necessary:
a) Normal power in both resistors.
b) Normal power in only one resistor.
c). Medium power in both resistors.
d) One-eighth or other selected fractional power in both resistors.

When adjusting the power to these four variables several problems arise such as the resistor coils in the case of coiled resistors being self-supporting, above all if they are located inside a quartz tube and must be self-supporting, and complex commutations, which problems are overcome in this case by electronic control of the power supplied to each resistor in each of the user selected working modes.

The control system is based on pulse trains that vary in size according to the desired power and can be sent to one or both heating resistors.

DESCRIPTION OF THE DRAWING

In order to complement the description being made and to assist a better understanding of the characteristic of the invention, attached hereto as part of the specification is FIG. 1 of the drawing illustrating, albeit not restricting, the system by means of a block diagram that is moreover provided with the actuation and indicator means.

DESCRIPTION OF PREFERRED EMBODIMENT OF THE INVENTION

In the light of the figure it can be seen that the improvements in household toasters subject hereof rely on the use of an electronic circuit provided in the toaster 10 designed for the most beneficial operation when connected to the mains (1). It is fitted with an own power supply (2) generating continuous twelve volts potential for the control circuit.

Both toasting the toast and keeping it warm takes place by means of two heating resistors R1 and R2. Power supply to the resistors is controlled by means of a pair of triacs (3a) representing the circuit's power stage (3); each triac controls a respective resistor. The electronic group's main function is to control the power stage (3) in order that the amount of energy reaching the resistors, depending on the selected operating mode, is sufficient; and furthermore to time the toasting and keep the heat. For suitable operation of the triacs, a zero passage (4) detector circuit is included to synchronize commutation of such triacs when the system voltage passes through zero, thereby to prevent system disturbances.

The toasting cycled starts when the toast-carrier is pushed down by hand, whereupon the starting switch I1 is automatically energised. This initializes the toasting (5) and heat-holding (6) timers. The toasting timer (5) acts on the locking coil B1, which holds the toast-carrier at its lower position, and also energizes the toasting or holding indicator L1, leaving it on. The duration of this stage can be programmed by the user by means of the toasting control timer M1. Once such time has elapsed, since the toast-carrier is pushed down, the latter returns to its original position when the locking coil B1 is de-energized; the toasting or holding L1 indicator L1 is also switched off.

Furthermore, it is possible to lower the heating power by pushing button P2. The latter acts upon the normal or medium power control (7) sending orders to the power stage (3) with the necessary frequency to obtain below normal operation heat dissipation at the heating resistors. By pressing P2 again, the circuit returns to normal power mode. When the toaster operates in the medium power mode, the control keeps the medium power indicator L2 on.

At this point, the stage to keep the toasts'warm begins, where it is necessary for the heat dissipated at R1 resistors and R2 to be lowered with regard to the previous phase. To such end, the heat holding timer (6) sends signals to the power stage every now and then, so that the amount of energy transmitted to the heating resistors will be enough to keep the toasts warm without burning the same; it also deals with intermittently switching on and off the toasting or holding indicator L1. The heat-holding timer (6) circuit is calculated so that this operation takes place until at least ten minutes have elapsed since the toast-carrier returned to its higher position and power went from toasting to holding.

The circuit to select one or two sides (8) is energized when the user pushes button P3, inhibiting operation of the triac controlling power supply to resistor R2; thus, only one of the heating resistors begins to operate and toasting takes place only on one side and during such time indicator L3 stays on. By pressing P3 again, the circuit returns to the two-side toasting mode.

Finally, the toaster's circuit is provided with a stop and ejector button P1 that acts upon the toasting (5) and holding (6) timers causing the toasting and holding cycle to stop automatically and the toasts to be ejected in the event of the toast-carrier being in the lower position.

We feel that the device has now been described at sufficient length for any expert in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. In a household toaster, an electronic power control comprising a power stage (3) fitted with two triacs (3a) for controlling the power supplied to two heating resistors (R1, R2) of the toaster; control elements including a zero passage detector (4), a toasting timer (5), a heat-holding timer (6), a power control (7), a selector circuit (8) for selecting one or two of said resistors to operate one or two sides of the toaster; a start button (11); an ejector-and-stop button (P1); and a power supply (2) to supply requisite continuous voltage to the control elements, said control elements being each connected to said power stage so as to selectively provide a normally required power in both of said resistors, a normally required power in only one of said resistors, and a fractional power in both of said resistors for keeping a toast toasted in the toaster warm.

2. The household toaster according to claim 1, wherein the power control (7) is operated in toasting or holding stages to provide full cycles of the electronic power control, either continuously in the case of a top output or in cycles controlled by the power control (7), the selector circuit (8) and the heat-holding timer (6), in other cases, said triacs being tripped at zero passage in the electronic power control by means of the zero passage detector (4).

3. The household toaster according to claim 1, wherein the toasting timer (5) is connected to a toasting control timer (M1) and a locking coil (B1), the power control (7) is connected to an average power button (P2) and an average power indicator (L2) and the selector circuit (8) is connected to a one-side selector button (P3) and a one-side indicator (L3), and further comprising a toasting-or-holding indicator (L1).

4. The household toaster according to claim 2, wherein the toasting timer (5) is connected to a toasting control timer (M1) and a locking coil (B1), the power control (7) is connected to an average power button (P2) and an average power indicator (L2) and the selector circuit (8) is connected to a one-side selector button (P3) and a one-side indicator (L3), and further comprising a toasting-or-holding indicator (L1).

* * * * *